Nov. 18, 1947.   L. EDELMANN   2,430,921
METHOD OF MAKING HOSE COUPLINGS
Filed July 3, 1943   3 Sheets-Sheet 1

Inventor
Leo Edelmann
By Lloyd W. Patek
Attorney

Nov. 18, 1947. L. EDELMANN 2,430,921
METHOD OF MAKING HOSE COUPLINGS
Filed July 3, 1943 3 Sheets-Sheet 2

Inventor
Leo Edelmann
By Lloyd W. Patch
Attorney

Patented Nov. 18, 1947

2,430,921

UNITED STATES PATENT OFFICE 2,430,921

METHOD OF MAKING HOSE COUPLINGS

Leo Edelmann, Chicago, Ill.

Application July 3, 1943, Serial No. 493,452

2 Claims. (Cl. 29—148.2)

My invention relates to hose couplings, and the method of making and assembling the same, and particulary to hose end fittings or couplings such as are ordinarily applied to flexible hose, of rubber or other similar material, and used for fuel, brake, lubrication and other liquid and fluid conducting lines of automotive vehicles, aeroplanes, and other vehicles and machines and mechanisms where fluid-tight connections are required.

An object of my invention is to provide a coupling that is of simple and inexpensive construction, which will require a minimum amount of critical metals, and which will be highly efficient in use.

Another purpose is to so construct the coupling or fitting that it is readily adaptable for employment in both male and female couplings made up and functioning as compression fittings.

Still another object is to provide a coupling of this character in which the parts are substantially locked in interconnected relation, when the coupling is applied to a hose end, and with which the hose end is firmly gripped and clamped and held in such manner that there is little possibility or likelihood that the coupling and the associated parts thereof can blow off or become accidentally displaced or damaged.

A further object of my invention is to provide a structure particularly well adapted for employment with swiveled hose couplings, and which will permit embodiment of the swivel feature in either or both of the connected coupling parts, and will at the same time insure a liquid or fluid tight passage and connection through the coupling.

Still another purpose of my invention is to provide a method or process of making and assembling hose couplings whereby the parts of the coupling or fitting are locked together and are securely clamped and held to and upon the hose end.

Yet another object is to provide a method of associating and connecting the parts that will result in a swiveled connection and will insure proper clearance for rotation of the swiveling part without the necessity of special appliances or operations.

With the above and other objects in view, some of which will be set forth hereinafter, and others of which are inherent in the construction and application and use of the coupling or fitting, my invention includes certain novel features of construction and combinations of parts which will be hereinafter set forth in connection with the drawings and then pointed out in the claims.

Figure 1:
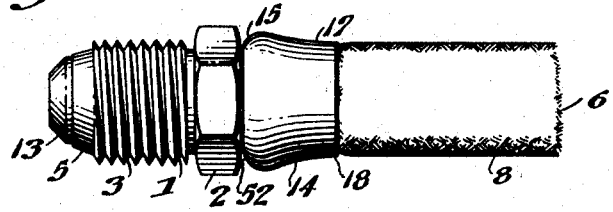
Figure 1 is a view in side elevation showing a hose end having a male coupling embodying my invention applied thereto.
Figure 2:
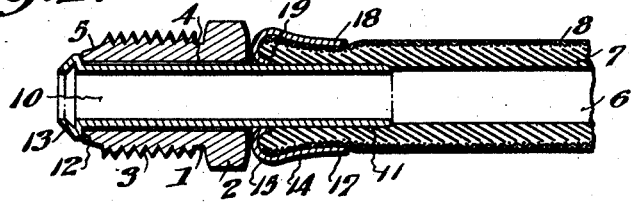
Fig. 2 is a longitudinal sectional view through the parts as disclosed in Figure 1.
Figure 3:
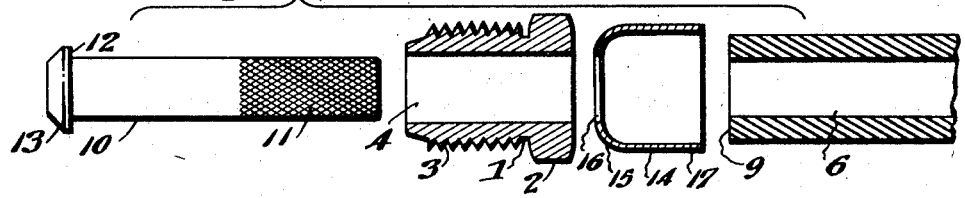
Fig. 3 is a view partly in elevation and partly in longitudinal section showing the parts and the hose end as they will appear when ready for assembly and association.

In the adaptation or embodiment of my invention as disclosed in Figs. 1, 2 and 3, I have illustrated a male coupling with a male compression portion. As here shown, the coupling member 1 has a hexagonal or polygonal portion 2 adapted to receive or accommodate a wrench, pliers, or other tool that may be employed to turn or tighten the coupling into connected relation. The coupling member 1 is reduced throughout the major portion of its length and is externally screw threaded, as at 3, and the entire coupling is provided with a central bore or opening 4. Obviously, this coupling member 1 can be made of various shapes and sizes and lengths for the particular use to which it is to be put, the screw threads at 3 can be of any desired pitch and gauge, and the end portion at 5 can be shaped or contoured to any desired form. This coupling portion can be readily manufactured in quantity production by the use of automatic screw machines or other automatic machinery, and where such a machine is employed the parts can be substantially continuously produced from hexagonal bar or other stock of desired external shape or contour. Further, since in my improved coupling, this coupling member 1 is not a direct conductor of liquid or fluid, this part can be made of metals or materials that could not ordinarily be used in couplings as heretofore made and in which previous couplings parts corresponding to the coupling member 1 have ordinarily served for liquid or fluid transmission or have otherwise been subjected to the liquid or fluid. Also, it will be appreciated that the part 1 can be molded or otherwise made up from plastic or any other suitable material.

The hose end 6 is here shown as constituting a tubular core 7 of rubber or other suitable material, with a covering 8 of braided cord or fabric, or other suitable material. This covering 8 can be lacquered or coated or can be otherwise treated to suit the conditions of use. The hose end 6 is of ordinary hose construction and might be reinforced in its body portion 7 with cord or metal strands, and in fact this can be any desired type and construction of hose. As is shown in Fig. 3, the hose end 6 will be cut across at its end substantially at right angles, as indicated at 9.

A tubular sleeve 10 is made of such external diameter that it can be pushed into the opening or passage of the hose end 6, and the opening 4 of coupling member 1 is of sufficient size to receive the coupling tube 10 with a turning fit. This coupling tube 10 can be readily made up of tubing, and can be of a material that will withstand or resist the effects of the liquid or fluid to be conducted. At one end, this connecting tube 10 is knurled or scored or is otherwise roughened, as at 11, so that when this end is pushed into the opening or passage of the hose end there will be increased resistance against withdrawal. At its opposite end this connecting or coupling tube or sleeve 10 is upset or spread and is formed to provide an inwardly facing flanged shoulder 12 and an outwardly facing male compression end 13.

A clamping ferrule or sleeve 14 has one end thereof rolled or contracted in, as at 15, and provided with a central opening 16 of a size to permit close passage therethrough of the end 11 of the sleeve or tube 10, and the skirt 17 of this ferrule or sleeve 14 is of sufficient internal diameter to receive the end of the hose 6 in a close fit.

In assembling the parts, the clamping ferrule or sleeve 14 will be fitted on the end of the hose 6, the tube 10 will be inserted through the opening 4 of the coupling member 1 to bring the shoulder 12 against the outer end of this coupling 1, and the end 11 of the tube 10 is then pressed or pushed into the opening of the hose end. As is shown in Fig. 2, the coupling tube 10 preferably has the end 11 thereof of sufficient length to extend inwardly beyond the edge of the skirt 17 of the clamping ferrule 14. When the parts are assembled in this way, the skirt 17 of the clamping ferrule or sleeve 14 is swaged in, substantially as shown at 18 in Fig. 2, so that the material of the wall 7 of the hose is securely clamped between the inner side of the contracted skirt 17 and the roughened outer side 11 of the coupling tube 10.

Figure 11:
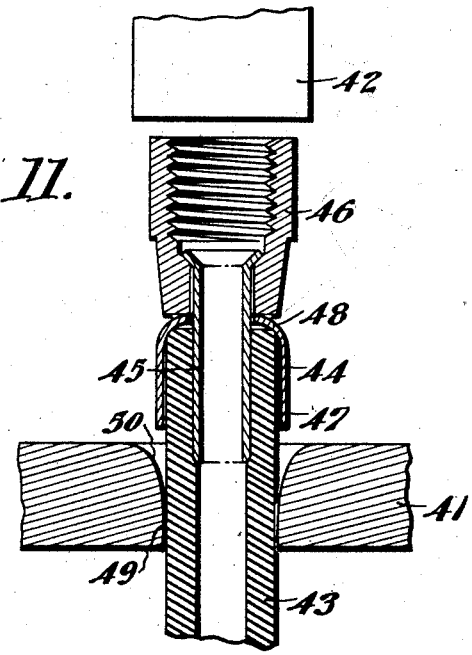
Fig. 11 is a vertical sectional view showing the parts of the coupling illustrated in Figs. 6, 7 and 8 in assembled relation prior to swaging and disclosing an embodiment of the method of this invention.
Figure 12:
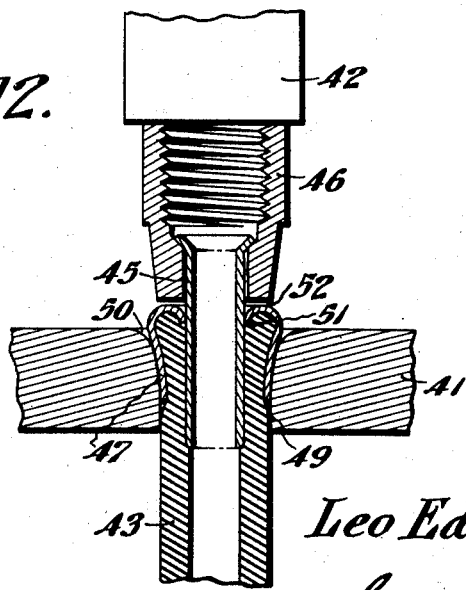
Fig. 12 is a view similar to Fig. 11 showing the parts following the carrying out of the method.

In Figs. 11 and 12 I have disclosed a method or process of applying and assembling the hose end, and have rather sketchily illustrated machine parts that might be employed. The parts of the coupling will be assembled by hand, or in any other desired or suitable manner, and the swaging of the skirt 17 of the clamping ferrule 14 is preferably accomplished somewhat after the manner of or in accordance with the method as disclosed in Figs. 11 and 12, and which illustration and method will be hereinafter more fully described, by application of swaging pressure upon the skirt 17 in a direction toward the coupling member 1, and with the coupling member exerting pressure upon the rounded over portion 15 in substantially an axial direction. The result of application of pressure in this way is that the rolled over portion 15 is forced or rolled inwardly, around the opening 16, to assume substantially the form as illustrated in Fig. 2, when the coupling is assembled. As here shown, the edge portion is rolled and turned in, as at 19, so that it substantially clampingly engages with the outer wall of the tubular sleeve or coupling sleeve 10. At the same time, the pressure of the coupling member 1 against the rolled portion 15 causes this portion to turn in, as at 19, this will cause slight compression or shortening in the overall length of the sleeve 14, in consequence of which there will be sufficient clearance between the rounded portion 15 of the ferrule 14 and the adjacent face of the coupling member 1 to allow free rotational swiveling of the coupling member 1.

It is explained that rubber and similar compounds or materials of which the wall 7 of the hose 6 would ordinarily be made are substantially non-compressible, and as the skirt 17 of the ferrule 14 is progressively reduced in diameter from its outer end toward the curved shoulder portion 15, this will cause or result in a flowing of the wall material 7 of the hose in a direction toward the curved end 15 so that in the finished product the wall material 7 will be flowed to substantially completely fill in and insure a liquid-tight connection entirely within the ferrule 14 and around the end 11 of the tubular coupling sleeve 10.

In couplings as previously manufactured, it has been common practice to make the various parts of brass or other materials that would be resistant to rusting or other undesirable effects from the liquid or fluid being conducted, and also it has been common practice to make parts corresponding to the tubular coupling sleeve 10 and the clamping ferrule 14 integral and to produce these parts by screw machine or other turning operations that resulted in considerable losses of this highly critical material. With my improved coupling it is possible to make all of the parts of some materials heretofore considered undesirable, and since the tubular coupling sleeve 10 is the only part that is subjected to contact with the liquid or fluid, this part might be made of ferrous metal tubing, now less critical than brass or copper, and might be metal plated, plastic coated or plated, or might be otherwise treated to make those portions subject to the liquid properly resistant.

Figure 6:
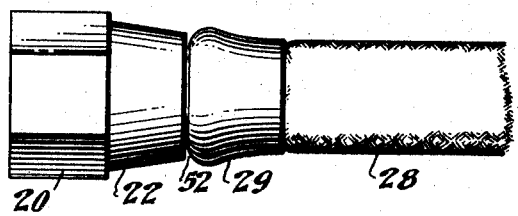
Fig. 6 is a view in side elevation showing a female coupling embodying my invention and applied to a hose end.
Figure 7:
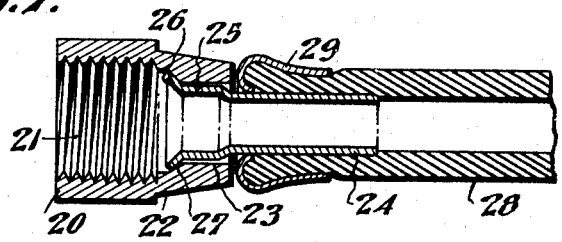
Fig. 7 is a longitudinal sectional view through the structure as shown in Fig. 6.
Figure 8:
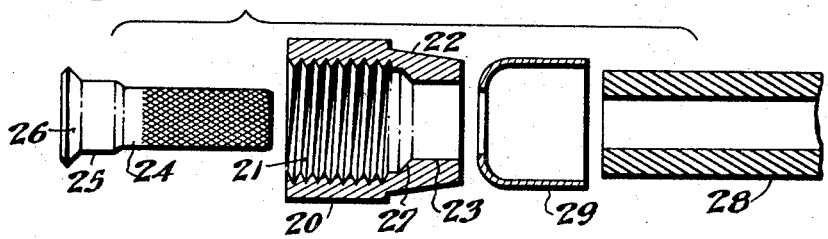
Fig. 8 is a disassembled view of the coupling and hose end showing the parts as they will appear before being brought into interfitted and connected relation.

Figs. 6, 7 and 8 illustrate a modified embodiment including a female coupling and a female compression portion. In this embodiment, the coupling member 20 has a screw threaded opening 21, adapted to receive a male coupling member such as or similar to the coupling member 1. This coupling member 20 is provided with an extension 22 which has an opening 23 therethrough.

A tubular coupling sleeve 24 is provided with a flared portion 25 which is received in turning fit within this opening 23, and the tubular coupling sleeve at its outer end terminates in a flared flange portion 26 which fits in shouldering relation against a corresponding formation 27 intermediate the threaded portion 21 and the opening 23. The mouth or bell of the flared formation 26 will serve as a female compression portion, and is conveniently shaped to conform to the shape of the male compression end 13 as disclosed in Figure 1.

The parts are assembled in the hose end 28, with a clamping ferrule 29 received around the outside of the hose end, and then this ferrule 29 is swaged or otherwise reduced in diameter in its skirt portion to clamp the hose end upon the tubular coupling sleeve 24.

While I have described the female coupling illustrated in Figs. 6, 7 and 8 as being adapted for use with the male coupling and compression fitting shown in Figs. 1, 2 and 3, and the reverse; it will be appreciated that either and both of these couplings and fittings can be used with other suitable couplings, and that where a swiveled coupling in accordance with my invention is employed on a hose end, this part can be readily turned into or onto a fixed or non-swiveled or non-rotatable female or male coupling to which connection of the hose end is to be made. Further, should it be desired to make either or both of the above-described embodiments of my invention of non-swiveling or non-rotatable construction and mounting, this can be readily accomplished by making the tubular coupling sleeve and the coupling member to assemble in non-rotatable fit.

Figure 4:
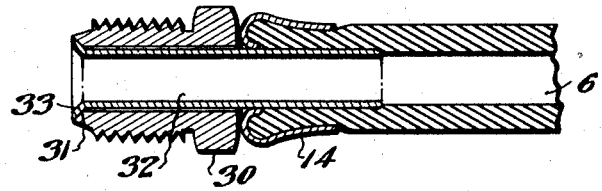
Fig. 4 is a view similar to Fig. 2 showing a modified construction.

In Fig. 4 I have illustrated a modified embodiment of the coupling as illustrated in Figs. 1, 2 and 3, and here the coupling member 30 has an inwardly beveled shoulder 31 at its outer end and around the opening receiving the tubular coupling sleeve 32. This tubular coupling sleeve has a flared flange 33 fitting and holding against the shoulder 31 to retain the coupling 30 in position; and, the flared portion 33 is conveniently formed in its open end as a female compression face or socket.

Figure 9:
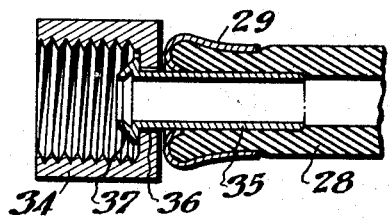
Fig. 9 is a view similar to Fig. 7 illustrating a modified construction.

With the modified embodiment of the invention illustrated in Fig. 9, the coupling member 34 is made relatively short length and the tubular coupling sleeve 35 received through the opening 36 of the coupling member 34 has a male compression fitting head 37 thereon somewhat corresponding to the compression head on the tubular coupling sleeve 10. Such a female coupling having a male compression portion can be used in connection with the coupling illustrated in Fig. 4, or with any other similar male coupling with female compression opening or socket.

Figure 10:
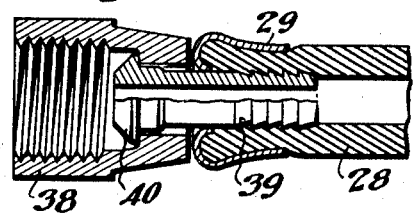
Fig. 10 is a similar view showing still another modified embodiment of my invention.

With the modified construction shown in Fig. 10, the parts are quite similar to the disclosure in Fig. 9, the coupling member 38 being of female coupling type, and the tubular coupling sleeve 39 being provided with a male compression end 40. As here shown, the tubular coupling sleeve 39 is made up from rod or bar stock turned or produced in an automatic screw machine, or with other suitable machinery or mechanism, and with the liquid or fluid passage bored therethrough; or, this part might be turned or screw machined from thick-walled tubular stock. Obviously, this tubular coupling sleeve 39 made by turning or machining the part might be employed in any or all of the other adaptations of my invention as heretofore illustrated and described. Where this part is made by turning or machining rod or bar or thick-walled tubular stock, the wastage or loss in scrap is relatively small by comparison with practices heretofore employed in making fittings, and since this part alone is subjected to contact with the liquid or fluid being conducted, this single part can, if necessary, be made of presently critical materials, such as copper, brass, zinc, or of other alloys or materials that can be immediately had only in limited quantities, and other portions of the coupling can be readily made up and produced from less critical or noncritical materials. The tubular coupling sleeve 39, in the embodiment in Fig. 10, and a similar part for each of the other embodiments of the invention as herein disclosed, might be made of molded plastic or of die cast metal, or of any other suitable material.

Figure 5:
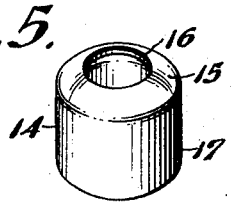
Fig. 5 is a view in perspective to better illustrate the hose clamping ferrule.

As is illustrated in Fig. 5, the clamping or connecting ferrule 14 is a relatively simple shape that can be readily stamped out or otherwise produced, with the skirt portion 17 being substantially tubular in general configuration and the rounded over portion 15 being such a curve as is readily accomplished by stamping or other well known operations. This part can be stamped or formed or otherwise made up from sheet iron or other sheet material, and if desired it can be coated or treated to make the outer surface, and perhaps also the inner surface, resistant to rust or other damaging conditions to which it might be subject in the atmosphere or where placed in use.

Referring now again, and in greater detail to the disclosure of Figs. 11 and 12, these illustrate, perhaps rather sketchily, an apparatus for and the steps resulting in the accomplishment of my improved method or process of making and assembling couplings.

The swage block 41 can be mounted in a punch press, or in any other suitable machine in position in line with a plunger head 42, or other suitable power exerting or press means. These parts can be arranged in substantially the relation shown in Figs. 11 and 12, or can be mounted with the plunger moving in a substantially horizontal line, or in fact can be disposed in any other desired or convenient arrangement. The parts will be assembled on the hose end 43, with the ferrule 44 fitted over and around the outer side of the extremity of the hose end 43 and the tubular coupling sleeve 45 passed through the coupling member 46. The end of the tubular coupling sleeve 45 is then inserted into the opening of the end of the hose 43 so that this coupling sleeve is disposed substantially concentrically within the skirt portion 47 of the ferrule 44. The parts then assume substantially the relation shown in Fig. 11.

The parts can be assembled in this way by hand operations, or by the use of any special tools or appliances, and the inner end of the coupling member 46 if here presented against the outer end of the rounded over shoulder portion 48 of the ferrule 44, the inner side of this rounded over portion 48 being presented against the end face of the hose end 43.

The swage block 41 has an opening 49 therethrough of sufficient diameter in its smallest portion to freely receive the hose 43, and on the side toward the plunger or pressing head 42, the opening 49 is widened out and is arcuately flared, as at 50. At the upper or outer face of the swage block 41, this flare is of sufficient size to receive and guide the edge of the skirt portion 47 of the ferrule 44, and the diameter is decreased so that when the plunger or presser member 42 is lowered or is moved against the coupling member 46, this coupling member will bear at its inner end against the rounded shoulder portion 48 of the ferrule 44 and will cause the entire assembly to be moved downwardly or endwise into the swaging opening 49 and 50 of the swage block 41, where the skirt portion 47 is swaged in gradually at its lower edge and then progressively toward the shoulder 48 to assume the reduced clamping size and shape substantially as shown in Fig. 12. The skirt portion 47 is first compressed in the area around its edge and then is progressively compressed to the desired finished form by being contracted toward the shoulder 48, and since the wall of the hose 43 is of rubber or other substantially non-compressible material, there is a tendency for the hose wall material to be flowed up into the ferrule 44 and toward the rounded shoulder 48. The pressure moving the assembly into the opening 49 and 50 of the swaging block 41 is exerted against the rounded shoulder portion 48, and is initially against the portion of this shoulder immediately around the opening receiving the tubular coupling sleeve 45. As the pressure is increased upon the rounded shoulder 48, this shoulder will be forced downwardly and the opening thereof will be contracted so that the outer sidewall of the coupling sleeve 45 will be clampingly engaged, and as the force required to move the skirt portion 47 into the swaging opening of the block 41 increases, the coupling member 46 will bear with increasing force against this end 48 and will cause the rounded shoulder portion to be curled over and inwardly in substantially the form shown in Fig. 12, where the edge 51 around the opening is curled over and is clampingly locked against the tubular sleeve 45. This curling over and inward movement of the portion 51 of the ferrule 44 will first cause the opening through the shoulder 48 to be contracted so that a forceful grip is exerted upon the outer wall of the sleeve 45, and as the pressure increases and the edge 51 is curled or rolled over, force will be exerted upon the coupling sleeve 45 tending to urge this sleeve into the opening of the hose end 43. At the same time, the skirt 47 is being contracted or swaged in so that the frictional bearing between the wall of the hose and the outer side of the sleeve 45 is increased, and it has been found that the parts gain slightly in their relative movement so that in the swaged and coupled product there is sufficient clearance, at 52, between the end of the ferrule 44 and the adjacent end of the coupling member 46 so that free swiveling movement is permitted.

Thus, by carrying out my method in accordance with the present invention the parts of the coupling are associated in such manner that the ferrule 44 and the tubular coupling sleeve 45 are substantially clamped and locked together, with the wall of the hose end 43 clampingly engaged therebetween and with the material of the wall flowed into and filling substantially all spaces between the swaged ferrule and the coupling sleeve so that a liquid and fluid tight connection of the coupling to the hose end is accomplished. This assembling and swaging of the parts insures that the coupling cannot pull or blow off from the hose end, and since the coupling sleeve 45 extends into the passage or opening of the hose end for a distance somewhat beyond the edge of the swaged skirt 47 of the ferrule 44, the hose end is reinforced at the coupling and there is little likelihood of chafing or breaking or blowing apart at this point. At the same time, the coupling portion 46 is secured upon the hose end and is swiveled to permit rotational movement thereof, without necessity for separate or special operations.

Where a male coupling such as shown in Figs. 1 through 4 is to be applied, the plunger or presser member 42 can be provided with a suitable socket or with any special form of fitting that will hold upon or against the coupling member of the particular shape, and the method of making or assembling the coupling can be carried out in substantially the same manner as described.

As has been stated, the tubular coupling sleeve portion can be made up of tubing and clamping ferrule can be formed from sheet metal as a stamping; further, since with my improved structure the tubular coupling sleeve portions are the only parts directly exposed or subjected to the conveyed liquid or fluid, portions of my coupling can be made of metals or plastics or other materials that might not withstand deleterious effects of the liquid or fluid, but will possess qualities suitable for the coupling or connecting functions.

Should it be desired to fix a coupling member of any one of the adaptations of my invention, so that it will be held against swiveling or rotation, this might be accomplished by a further operation of exerting force upon or against the male compression portion to force the shoulder thereof against the coupling member and clampingly engage the coupling member with the swaged-on ferrule, or by exerting expanding pressure within the female compression portion or within the end of the tubular coupling member sufficient to expand the parts into friction and clamping and holding engagement with the corresponding openings of the coupling member.

From the foregoing it will be seen that I have provided a hose coupling structure and a method or process of making and assembling the same that will result in hose couplings having distinct advantages over couplings heretofore used, in that the parts are clampingly locked together in substantially unitary association and yet the coupling member can be assembled for rotational or swiveling movement, if desired. Further, it will be seen that I have provided a coupling that can be made with a minimum of material and with portions thereof of non-critical materials, thus making possible a considerable saving in the use of some of the metals and materials now scarce or substantially non-obtainable because of war necessities and conditions. At the same time, my method or process of making and associating the parts not only results in a highly satisfactory and superior assembly and association of the parts, but makes possible the commercial production of a swivel coupling without the necessity of additional operations, thus relieving the present man power and machine shortage.

While I have herein shown and described only certain specific forms of male and female couplings, those skilled in the art will appreciate that the invention is adaptable to be embodied in many varieties and forms of fittings or adaptations of hose couplings, both male and female; and, it will be appreciated that many changes and variations can be resorted to in the form and construction and arrangement and assembly of the

I claim:

1. The method of making and assembling hose couplings which consists in providing a coupling member having an opening therethrough together with a tubular sleeve member adapted to be inserted through the opening and having an enlarged shoulder portion and also a clamping ferrule initially having a substantially cylindrical skirt wall portion with a rounded shoulder at one end leaving an opening of sufficient size for accommodation of the tubular sleeve member, said method comprising placing the clamping ferrule over the end of the hose portion to be coupled with the rounded shoulder thereof engaging with the end of the hose, fitting the tubular sleeve member through the opening of the coupling member with the enlarged portion retaining the coupling member in place and then inserting the tubular sleeve member in the opening of the hose end around which the ferrule is fitted, placing the parts as thus assembled with the hose portion loosely received within a swaging block having a flared throat presented toward the clamping ferrule, then exerting pressure upon the coupling member in a direction axially toward the swaging block thereby exerting pressure through the coupling member upon the rounded shoulder of the ferrule to force the skirt portion of said ferrule into the opening of the swaging block, and continuing the axial pressure and force until the skirt portion of the ferrule is clamped in against the hose wall and the rounded shoulder portion of the ferrule is rolled and contracted inwardly into clamping engagement and contact with the tubular sleeve member.

2. The method of making and assembling hose couplings which consists in providing a coupling member having an opening therethrough together with a tubular sleeve member adapted to be inserted through the opening and having an enlarged shoulder portion and also a clamping ferrule initially having a substantially cylindrical skirt wall portion with a rounded shoulder at one end leaving an opening of sufficient size for accommodation of the tubular sleeve member, said method comprising placing the clamping ferrule over the end of the hose portion to be coupled with the rounded shoulder thereof engaging with the end of the hose, fitting the tubular sleeve member through the opening of the coupling member with the enlarged portion retaining the coupling member in place and then inserting the tubular sleeve member in the opening of the hose end around which the ferrule is fitted, placing the parts as thus assembled with the hose portion loosely received within a swaging block having a flared throat presented toward the clamping ferrule, then exerting pressure upon the coupling member in a direction axially toward the swaging block thereby exerting pressure through the coupling member upon the rounded shoulder of the ferrule to force the skirt portion of said ferrule into the opening of the swaging block, continuing the axial pressure and force until the skirt portion of the ferrule is clamped in against the hose wall and the rounded shoulder portion of the ferrule is rolled and contracted inwardly into clamping engagement and contact with the tubular sleeve member, and stopping the application of pressure for the swaging and rolling movement at an interval to leave clearance between the rolled in shoulder and the enlarged end of the tubular sleeve member sufficient to allow swiveling rotational movement of the coupling member.

LEO EDELMANN.

REFERENCES CITED

The following references are of record in the file of this patent:

UNITED STATES PATENTS

| Number | Name | Date |
|---|---|---|
| 1,901,088 | Dick | Mar. 14, 1933 |
| 2,077,869 | Bennett | Apr. 20, 1937 |
| 1,965,426 | Nelson | July 3, 1934 |
| 1,778,244 | Cadden | Oct. 14, 1930 |
| 440,844 | Hallas | Nov. 18, 1890 |
| 1,951,860 | Cowles | Mar. 20, 1934 |
| 1,969,548 | Eastman | Aug. 7, 1934 |
| 2,019,540 | Mascuch | Nov. 5, 1935 |
| 2,054,362 | Cowles | Sept. 15, 1936 |